W. F. FOLMER.
AEROPLANE CAMERA.
APPLICATION FILED JAN. 14, 1918.
1,304,673.
Patented May 27, 1919.
4 SHEETS—SHEET 1.
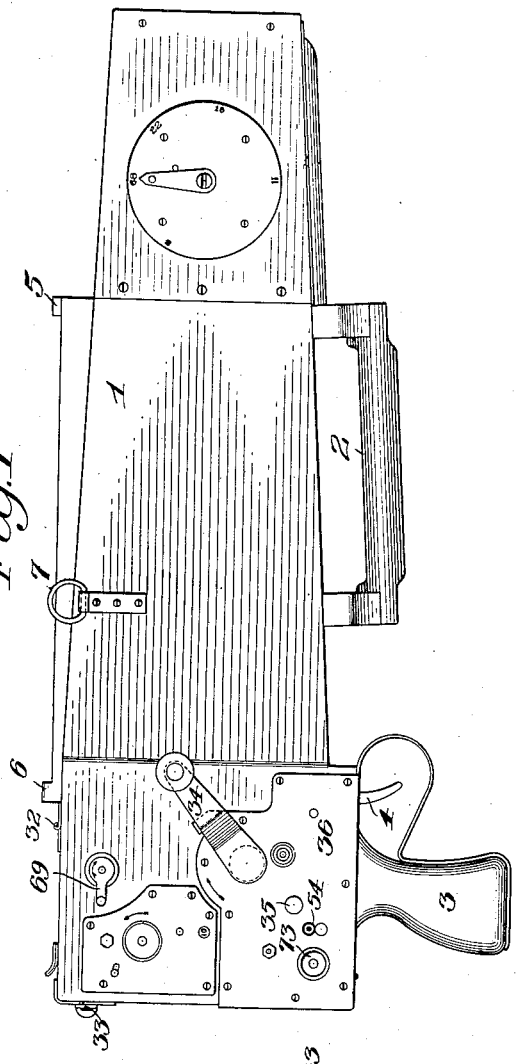
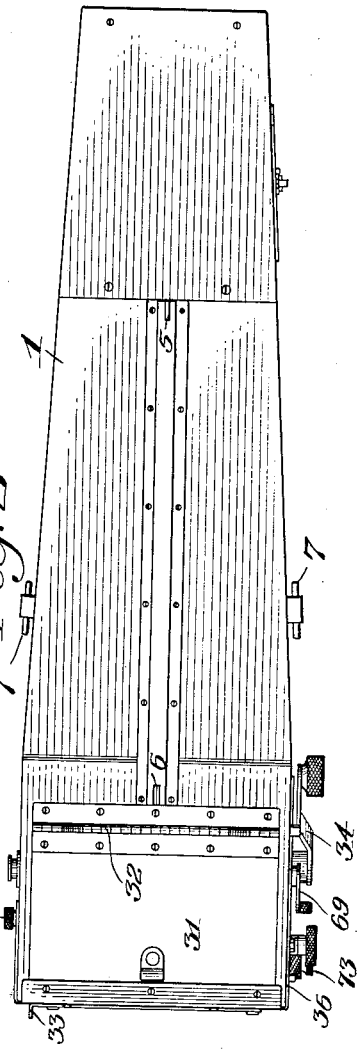
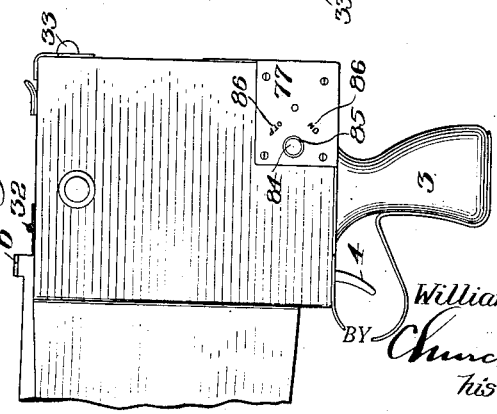
WITNESSES:
Nelson H. Copp
INVENTOR.
William F. Folmer
BY
his ATTORNEYS.

W. F. FOLMER.
AEROPLANE CAMERA.
APPLICATION FILED JAN. 14, 1919.
1,304,673.
Patented May 27, 1919.
4 SHEETS—SHEET 2.
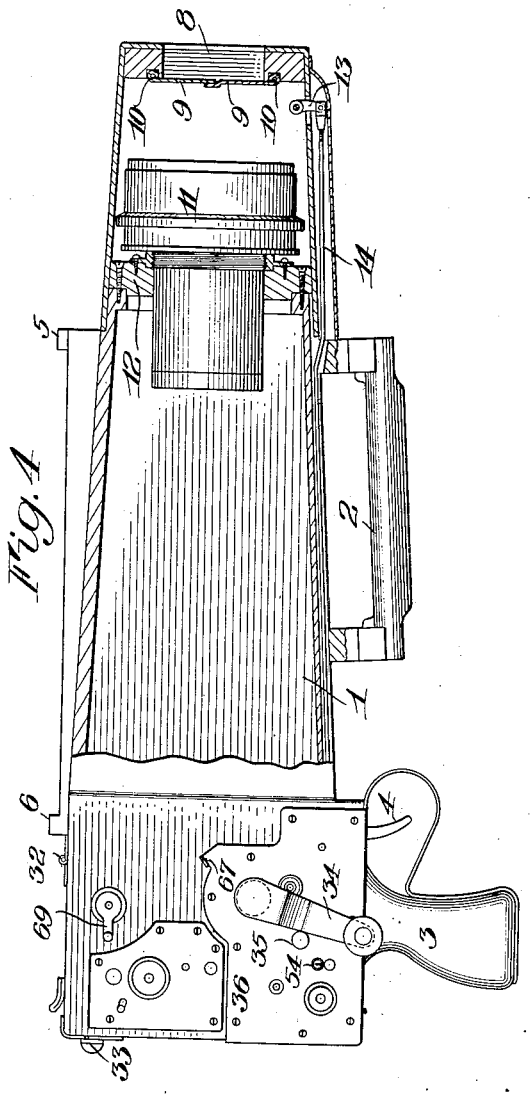
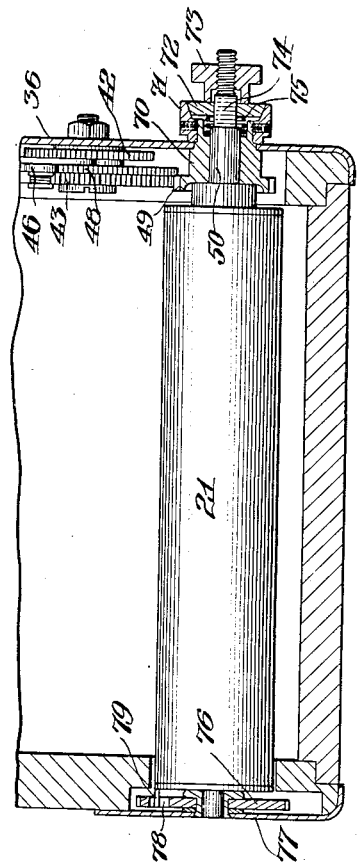
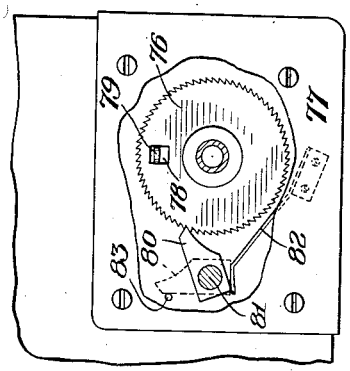
WITNESSES:
INVENTOR.
William F. Folmer
BY
his ATTORNEYS.

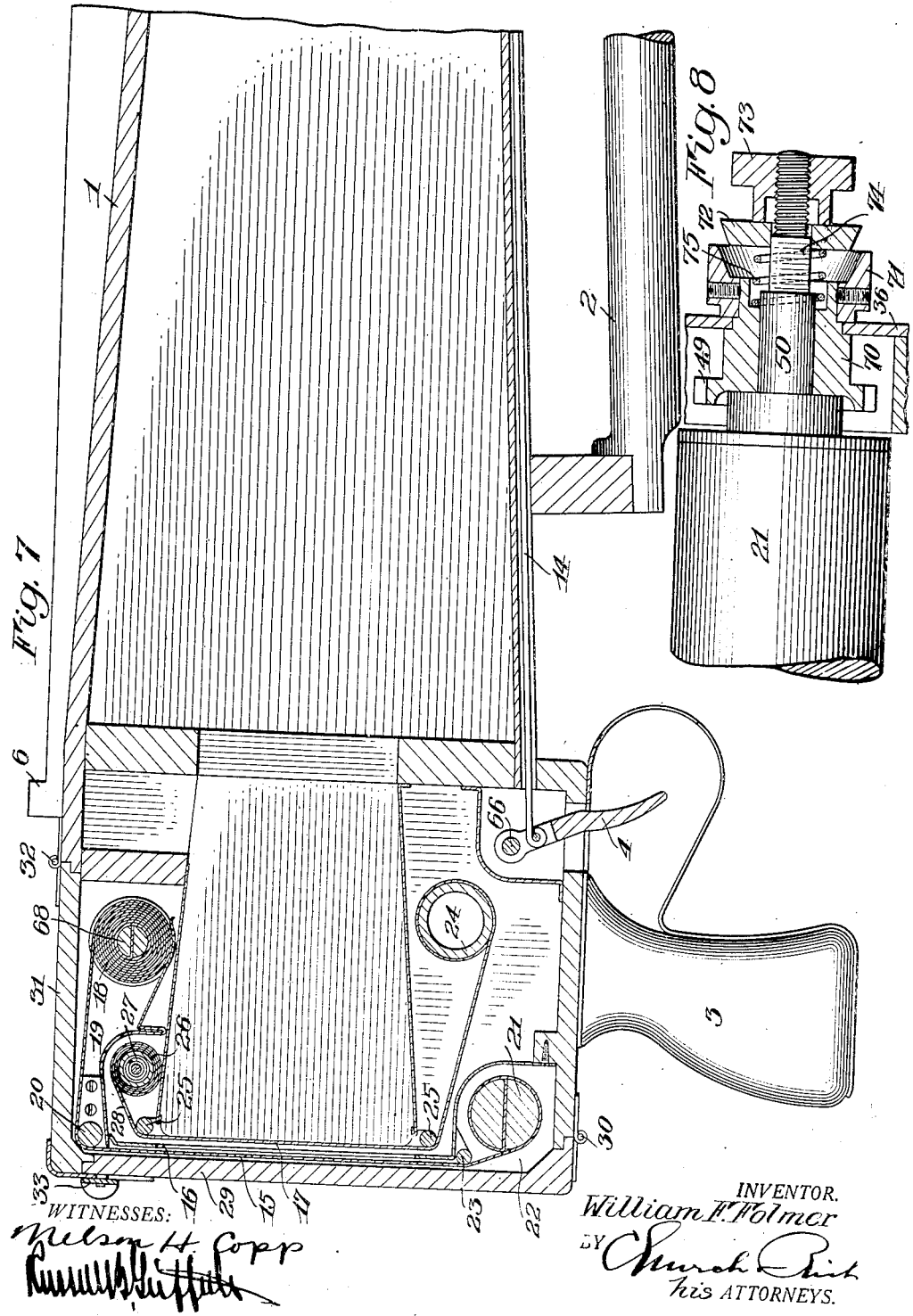

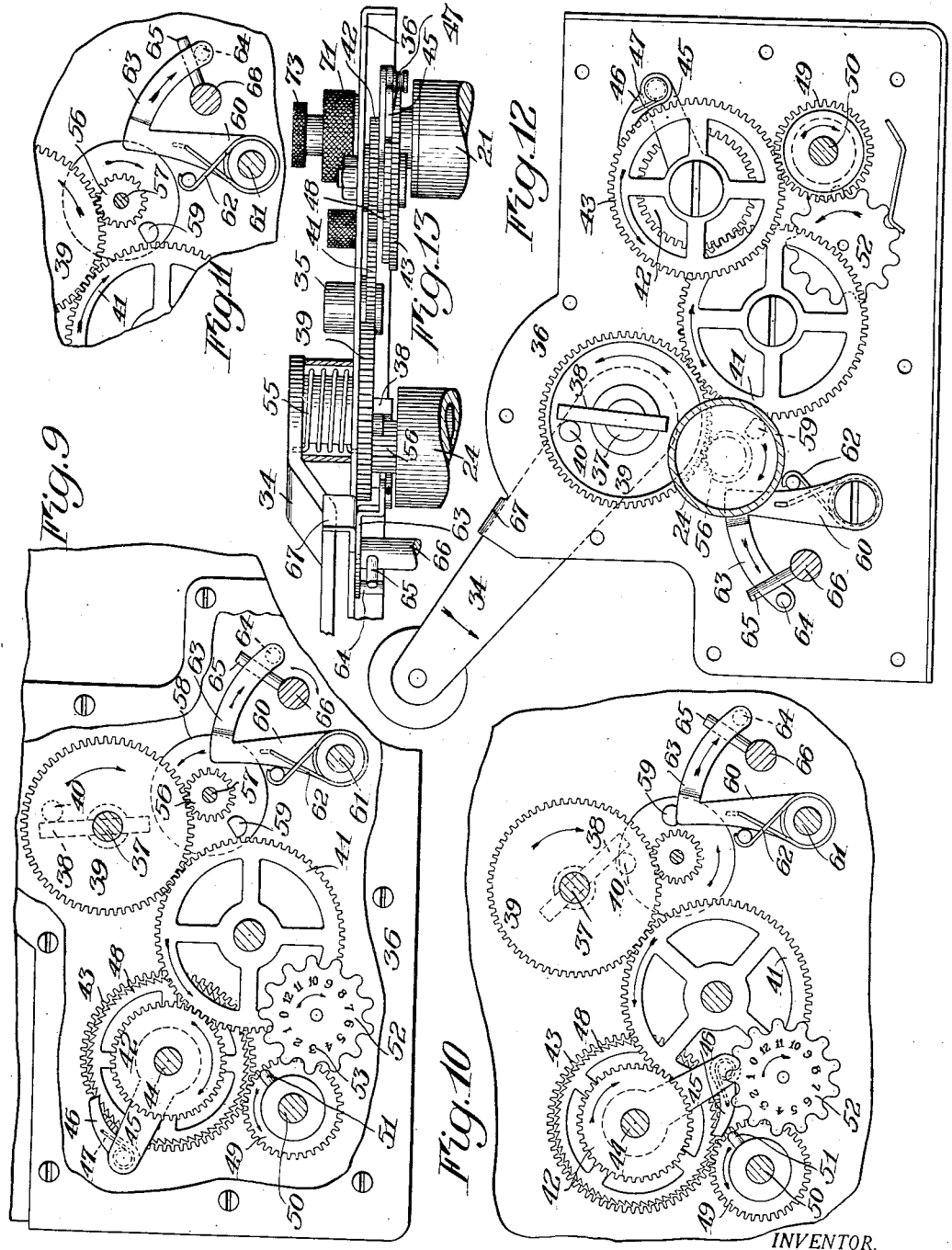

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

AEROPLANE-CAMERA.

1,304,673.   Specification of Letters Patent.   Patented May 27, 1919.

Application filed January 14, 1918. Serial No. 211,717.

*To all whom it may concern:*

Be it known that I, WILLIAM F. FOLMER, of Rochester, in the county of Monroe and State of New York, have invented certain new and useful Improvements in Aeroplane-Cameras; and I do hereby declare the following to be a full, clear, and exact description of the same, reference being had to the accompanying drawings, forming a part of this specification, and to the reference-numerals marked thereon.

My present invention relates to photography and more particularly to photographic cameras and has for its object to provide an improved apparatus suitable for use in taking photographs from aeroplanes. The improvements are directed toward rendering the camera conveniently operable under the conditions of aerial use. To these and other ends the invention resides in certain improvements and combinations of parts all as will be hereinafter more fully described the novel features being pointed out in the claims at the end of the specification.

In the drawings:

Figure 1 is a side view of a camera constructed in accordance with and illustrating one embodiment of my invention, the parts being in normal positions;

Fig. 2 is a top plan view;

Fig. 3 is a fragmentary side view showing the side opposite to that shown in Fig. 1;

Fig. 4 is a view corresponding to Fig. 1 but with the side wall of the camera body broken away to give it a sectional view of parts of the interior;

Fig. 5 is an enlarged fragmentary sectional view taken through the axis of the film winding roll;

Fig. 6 is a detail section through the journal of said roller to give an end view of certain controlling mechanism, a part of the cover plate for said mechanism being broken away;

Fig. 7 is an enlarged fragmentary section taken centrally of the rear portion of the body;

Fig. 8 is an enlarged fragmentary view partly in section of a detail of the film winding roll;

Fig. 9 is a fragmentary view partly broken away and partly in section of the operating mechanism controlling the shutter and film feed with the parts in normal position;

Fig. 10 is a similar view with the parts in set position;

Fig. 11 is a fragmentary view showing shutter parts illustrated in Figs. 9 and 10 in another position;

Fig. 12 is a view of the mechanism of Figs. 9 and 10 from the other or inner side, and Fig. 13 is a top view of the parts shown in Fig. 12.

Similar reference numerals throughout the several views indicate the same parts.

As before mentioned, the present camera is adapted particularly for aeroplane work and for this reason a lens of long focus is employed in an elongated camera body or casing 1 having a hand hold 2 beneath it at a substantially central point and a pistol grip 3 at the rear with an adjacent operating trigger 4 so that it may be handled similarly to a gun, the direction of aim being determined by front and rear sights 5 and 6. A strap may be attached to the rings 7 to further support the camera from the operator's neck.

The opening 8 at the front of the camera (Fig. 4) is normally closed by a flap shutter consisting of overlapping doors 9 pivoted at 10 which protect the lens in the lens tube 11 in rear thereof from wind, dust and fog, the lens being mounted in a partition 12 within the camera body. Through operating connections, not shown, the doors 9 of the flap shutter are opened through a rearward pull on a lever 13 connected by a pull rod 14 with the trigger 4 (Figs. 4 and 7). The pressure of the finger on the trigger opens the shutter and it is closed by a spring that is also not shown, the details of this shutter being immaterial to the present invention.

In the present instance, I have shown a film camera using a focal plane or curtain shutter, Fig. 7. The film 15 is stretched in the focal plane in rear of the exposure opening 16 while in front of the latter operates a shutter curtain 17. The film 15 is drawn from a supply spool 18 in a film chamber 19 over a guide roll 20 and is taken up on a winding roll or spool 21 in a roll chamber 22 after passing over a second guide roll 23. The curtain 17 of the shutter travels upwardly during its exposing movement and downwardly during its winding movement. To set it, it is wound upon a winding roll 24 over guide rolls 25 from a tension roll 26 having a spring 27, as usual. The shutter opening is indicated at 28 and in Fig. 7, the shutter has been operated and is ready for re-winding.

Access to the rear of the camera is gained by means of a hinged back 29 pivoted at 30 and access to the film supply chamber 19 is gained through a door 31 hinged at 32, the two doors being held locked in closed position by a common fastening device 33.

When an exposure has been made and the parts occupy the positions of Fig. 7, a new stretch of film is wound into the focal plane and the curtain shutter 17 is rewound at the same time by swinging an operating lever 34 on the exterior of the camera body from the position of Fig. 1 to that of Fig. 4 against a stop 35 on a mounting plate 36 in which the lever or crank 34 has a bearing. On the shaft 37 of the operating crank (Fig. 12) is a dog 38 and turning freely on the shaft is a gear 39 having a pin 40 thereon in the path of the dog. As the crank is swung downwardly, it moves the gear from the position of Figs. 9 and 12 to that of Fig. 10 and through it turns the curtain winding roll 24 and the film winding roll 21 in the following manner.

The gear 39 is part of a train comprising a gear 41 and gears 42 and 43 on a shaft 44, said gears 42 and 43 being relatively movable. The intermediate gear 41 meshes with gear 42 and an arm 45 on the latter carries a pawl 46 having a spring 47 that holds it in engagement with a ratchet 48 fixed to gear 43 so that gears 42 and 43 may turn together only in one direction. Gear 43 meshes with a gear 49 fixed to the shaft 50 of the film winding roll 21. As the operating crank or lever 34 is depressed, the various gears turn in the directions of the arrows and rotate the shaft 50 of the film winding roller sufficiently to wind one picture area of the film strip thereon. At each winding a tooth 51 on the shaft 50 turns an indicator wheel 52 one step and displays one of a series of numbers 53 through an opening 54 in the plate 36 (Fig. 4) to show the number of picture areas that have been fed. As soon as the operating crank 34 is released, it flies back to the normal position of Fig. 1 independently of the gear train under the influence of a spring 55 shown in Fig. 13 because of freedom of movement of the dog 38 away from the pin 40 in a direction opposite to that indicated by the arrow in Fig. 10. The gear train is therefore moved only in one direction by the crank 34.

The gear 39 also meshes directly with a gear 56 fixed to the shaft 57 of the curtain winding roller 24 of the shutter 17. Fixed to this gear 56 is a disk 58 having a laterally projecting pin 59. The downward movement of the operating tank 34 therefore winds the curtain shutter also and in passing from the position of Fig. 9 to that of Fig. 10, the pin 59 first displaces and is then locked by a detent 60 mounted on a pivot 61 and actuated into the path of the pin by a spring 62. This holds the shutter wound against the tension of the spring 27 of tension roll 26 which is otherwise free to cause the exposing movement of the shutter and to turn not only gear 56 of the winding roll but gears 39, 41 and 42. There is an arm 63 on the detent 60 provided with a lateral pin or abutment 64 and this pin is adapted to be engaged by a dog 65 on the shaft 66 of the trigger 4 (Figs. 9 and 7). Hence, when the trigger 4 is pulled to open the flap shutter 9, it also trips the detent 60 and allows the curtain shutter to operate, as shown in Fig. 11. This turns the gear train in a direction opposite to the arrows in Figs. 9, 10 and 12 with the exception of the gears 43 and 49 which, because of the ratchet and pawl connection 46, 48 remain idle as otherwise the film winding roll 21 on shaft 50 would be turned backward. The pin 40 returns to engagement with the dog 38 as in Fig. 9. On the return of the operating crank 34 which, as before described, has taken place before the exposure, it is halted by a stop 67 on the plate 36.

From the above it will be seen that gears 39, 41, 42 and 56 are turned in one direction by the setting crank 34 and in the other direction by the tension roller 26 of the shutter while gears 43 and 49 move in only the one direction.

The film winding roll 21 is preferably a permanently mounted roll and the film is not removed from the camera thereon in the usual manner but is wound back upon the spool 68 of the supply roll 18 and then removed through door 31. Spool 68 is provided with the usual journal supports, one being constituted by a winding key 69. To permit the unwinding from roll 21, the latter is connected for rotation to the gear train by a clutch device shown in Figs. 5 and 8 and embodying an arrangement whereby the gear 49 may be disconnected from the shaft 50 of the roll and allow the shaft to turn idly therein. Said gear has a hub 70 surrounding the shaft and provided with a cone socket 71 in which a clutch cone 72 may be jammed by a thumb nut 73 threaded on the shaft. The cone 72 fits a squared portion 74 of the shaft and when it is locked to the gear the latter and the shaft turn together but when the nut 73 is loosened and the cone is released by a spring 75, the shaft and roll turn independently of the gear. Therefore the film can be rewound without affecting the gear train by disconnecting the winding roll 21.

There must also be disconnected a ratchet 76 that is provided at the other end of the roll 21 to prevent back wind at all times. This ratchet wheel is mounted on a plate 77 (Fig. 3) and has an opening 78 therein engaged by a dog 79 on the roll 21. A pawl 80 pivoted to the plate at 81 is engaged by a spring 82 to normally hold it in engagement with the ratchet as shown in full lines in Fig. 6 but for rewinding purposes, the pawl may be thrown out to the dotted line position against a stop 83 by means of a knob 84 on the exterior of the camera. An indicator 85 on the knob points to "On" and "Off" characters 86 on the plate 77.

I claim as my invention:

1. In a camera, the combination with a film winding spool, means for detachably supporting a removable supply spool and a shutter, of operating mechanism for rotating the winding spool and moving the shutter, a clutch interposed between the winding spool and said operating mechanism and a separate operating member for rotating the supply spool support to rewind the film thereon.

2. In a camera, the combination with a film winding spool, means for detachably supporting a removable supply spool and a curtain shutter embodying a tension roll and a winding roll, of a gear train for turning both the film winding spool and the shutter winding roll, a vibratory operating lever having a pick-up connection with the gear train, a ratchet and pawl interposed in the train between the operating lever and the film winding spool, a clutch interposed between the latter and the train, and a separate operating member for rotating the supply spool support.

WILLIAM F. FOLMER.

Witnesses:
AGNES NESBITT BISSELL,
M. MADELINE MILLER.